United States Patent [19]
Duhem

[11] Patent Number: 5,984,037
[45] Date of Patent: Nov. 16, 1999

[54] PIVOTING FENDER ASSEMBLY FOR A WORK MACHINE HAVING A PROTECTIVE RECESS FOR AN ASSOCIATED LATCH ASSEMBLY

[75] Inventor: Jean-Marc Duhem, Asquillies, Belgium

[73] Assignee: Caterpillar Inc., Peoria, Ill.

[21] Appl. No.: 08/977,179

[22] Filed: Nov. 24, 1997

[51] Int. Cl.⁶ .................................................. B62D 25/10
[52] U.S. Cl. ...................................... 180/89.17; 180/69.2
[58] Field of Search ................................. 180/89.17, 69.2

[56] References Cited

U.S. PATENT DOCUMENTS

| | | | |
|---|---|---|---|
| 2,157,793 | 5/1939 | Lang | 280/848 |
| 2,163,321 | 6/1939 | Harroun et al. | 280/848 |
| 2,211,654 | 8/1940 | Heaslet | 280/847 |
| 2,699,223 | 1/1955 | Brunbaugh | 180/89.17 |
| 2,725,251 | 11/1955 | Wagner | 180/89.17 |
| 2,769,503 | 11/1956 | Wagner | 180/89.17 |
| 2,833,364 | 5/1958 | Lee | 180/69.2 |
| 3,217,354 | 11/1965 | May | 180/89.17 |
| 4,339,016 | 7/1982 | Gerresheim | 180/89.17 |

*Primary Examiner*—Kenneth R. Rice
*Attorney, Agent, or Firm*—Maginot & Addison

[57] ABSTRACT

A fender assembly for a work machine is disclosed. The fender assembly includes a fender body having an upper panel and a lower panel. The upper panel has a latch recess defined therein. The lower panel is spaced apart from the upper panel so as to define an actuator chamber. A latch assembly is positioned in the latch recess. A rod for moving the latch assembly between a lock position and a release position extends through the actuator chamber. The first end of the rod is coupled to the latch assembly, and the second end of the rod is positioned on the top side of the upper panel in order to be accessible to a user. The lower panel is positioned between the latch assembly and the wheels of the work machine in order to prevent mud, dirt, or other types of debris from contacting the latch assembly during operation of the work machine.

20 Claims, 6 Drawing Sheets

PIVOTING FENDER ASSEMBLY FOR A WORK MACHINE HAVING A PROTECTIVE RECESS FOR AN ASSOCIATED LATCH ASSEMBLY

TECHNICAL FIELD OF THE INVENTION

The present invention relates generally to a fender assembly for a work machine, and more particularly to a pivoting fender assembly for a work machine having a latch mechanism positioned in a recess defined in the top side of a fender body associated therewith.

BACKGROUND OF THE INVENTION

Many work machines, such as wheel loaders, include fender assemblies to prevent mud, dirt, or other types of debris from being flung or otherwise thrown from the wheels of the work machine during operation thereof. It is often necessary to remove or otherwise reposition the fender assembly in order to access a number of components associated with the work machine. Hence, a number of pivoting fender assemblies have heretofore been designed which pivot relative to the frame of the work machine thereby allowing the fender assembly to be moved when it is necessary to access machine components proximate the fender assembly.

Such pivoting fender assemblies typically have a pivot joint at a first end thereof, and a latch mechanism at a second end thereof. If the latch mechanism is unlocked, the fender assembly is free to pivot about the pivot joint thereby allowing the fender assembly to be moved relative the frame assembly of the work machine. However, if the latch mechanism is locked, the second end of the fender assembly is latched or otherwise secured to the work machine.

Such latch mechanisms are typically positioned in locations which render the latch mechanism not only difficult to operate, but also expose the latch mechanism to a harsh environment thereby reducing the useful life of the latch mechanism. For example, a number of fender assemblies which have heretofore been designed include a latch mechanism positioned adjacent to an underside of the fender assembly thereby rendering the latch mechanism difficult to operate. In addition, when positioned on the underside of the fender assembly, the latch assembly is exposed to the mud, dirt, and other types of debris which are encountered by the wheels of the work machine thereby potentially reducing the useful life of the latch assembly.

What is needed therefore is a fender assembly for a work machine which overcomes one or more of the above-mentioned drawbacks.

Disclosure of the Invention

In accordance with a first embodiment of the present invention, there is provided a fender assembly for a work machine. The fender assembly includes a fender body having an first panel. The fender body is positionable between an operation position and an access position. The first panel has a latch recess defined therein. The first panel further has a user-side opening and a latch-side opening defined therein. The latch-side opening is located within the latch recess. The fender assembly further includes a latch assembly positioned in the latch recess. The latch assembly is positionable between (i) a lock position in which the fender body is secured in the operation position, and (ii) a release position in which the fender body is allowed to move between the operation position and the access position. The fender assembly also includes an actuator for moving the latch assembly between the lock position and the release position. The actuator extends from a user-side location to a latch-side location through the user-side opening and the latch-side opening. The user-side location is located above the first panel of the fender body. The latch-side location is located within the latch recess.

In accordance with a second embodiment of the present invention, there is provided a fender assembly for a work machine. The fender assembly includes a fender body having an upper panel and a lower panel. The fender body is positionable between an operation position and an access position. The upper panel has a latch recess defined therein. The upper panel further has a user-side opening and a latch-side opening defined therein. The latch-side opening is located within the latch recess. The lower panel is spaced apart from the upper panel so as to define an actuator chamber. The fender assembly further includes a latch assembly positioned in the latch recess. The latch assembly is positionable between (i) a lock position in which the fender body is secured in the operation position, and (ii) a release position in which the fender body is allowed to move between the operation position and the access position. Moreover, the fender assembly includes an actuator for moving the latch assembly between the lock position and the release position. The actuator extends from a user-side location to a latch-side location through the user-side opening and the latch-side opening. The user-side location is located above the upper panel of the fender body. The latch-side location is located within the latch recess. The actuator further includes an intermediate portion, a user end portion, and a latch end portion. The intermediate portion extends between the user-side opening and the latch-side opening and is located within the actuator chamber, whereas latch-end portion is secured to the latch assembly, and the user-end portion is located above the upper panel of the fender body.

In accordance with a third embodiment of the present invention, there is provided a work machine. The work machine includes a fender body having an first panel. The fender body is positionable between an operation position and an access position. The first panel has a latch recess defined therein. The first panel further has a user-side opening and a latch-side opening defined therein. The latch-side opening is located within the latch recess. The work machine further includes a latch assembly positioned in the latch recess. The latch assembly is positionable between (i) a lock position in which the fender body is secured in the operation position, and (ii) a release position in which the fender body is allowed to move between the operation position and the access position. The work machine further includes an actuator for moving the latch assembly between the lock position and the release position. The actuator extends from a user-side location to a latch-side location through the user-side opening and the latch-side opening. The user-side location is located above the first panel of the fender body. The latch-side location is located within the latch recess. The work machine further includes a recess cover which is secured over the latch recess. The work machine also includes a shoe block. The fender body further has a shoe recess defined therein, and the shoe block is secured within the shoe recess. Moreover, the work machine includes a structural member. The fender body is secured to the structural member when the fender body is positioned in the operation position, whereas the fender body is spaced apart from the structural member when the fender body is positioned in the access position. The work machine yet further includes a guide member. The guide member is secured to the structural member. The guide member has a guide channel defined therein. The shoe block is positioned within the guide channel when the fender assembly is positioned in the operation position. The shoe block is spaced apart from the guide channel when the fender assembly is positioned in the access position.

BEST MODE FOR CARRYING OUT THE INVENTION

Figure 1:
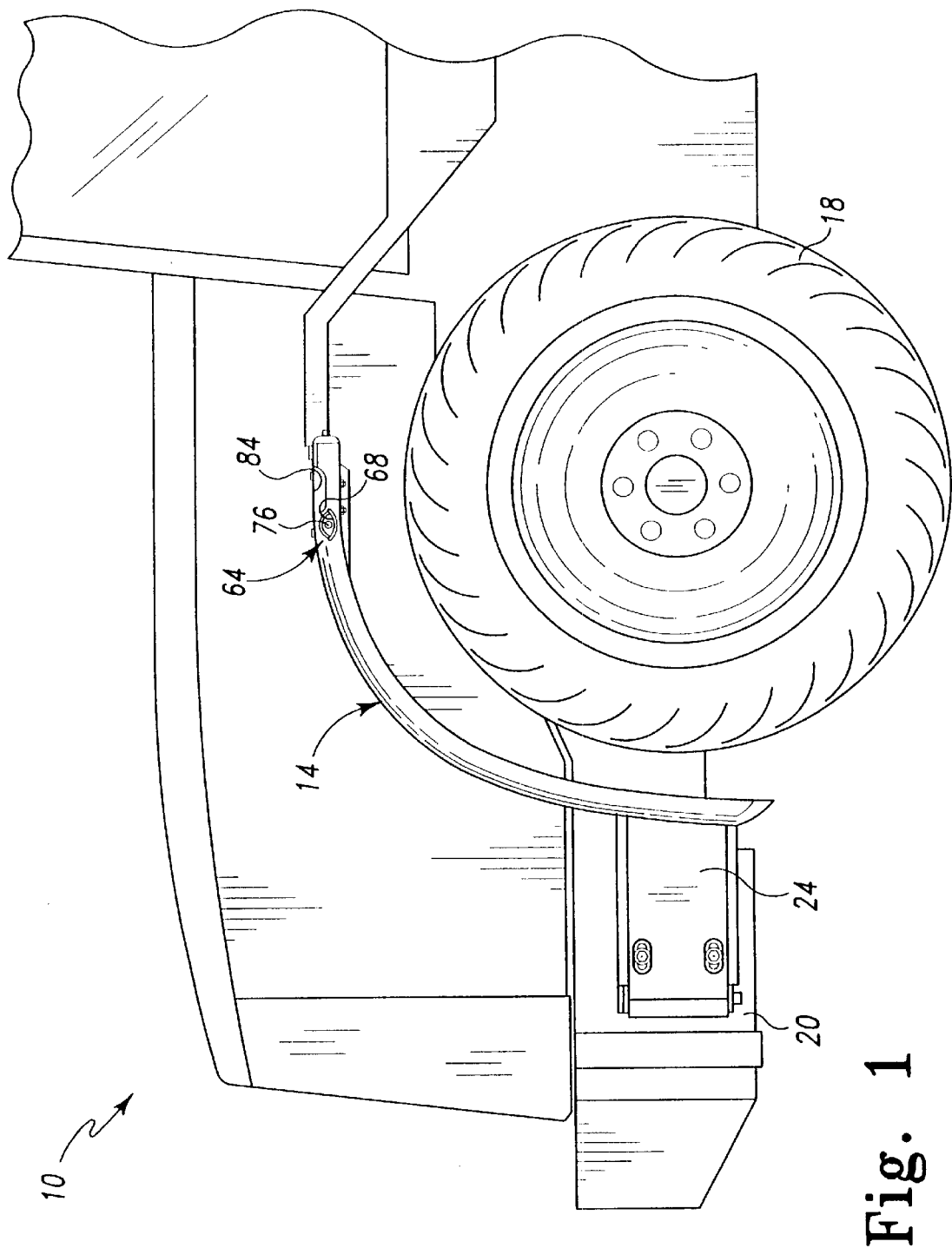
FIG. 1 is a fragmentary side elevational view of a work machine which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
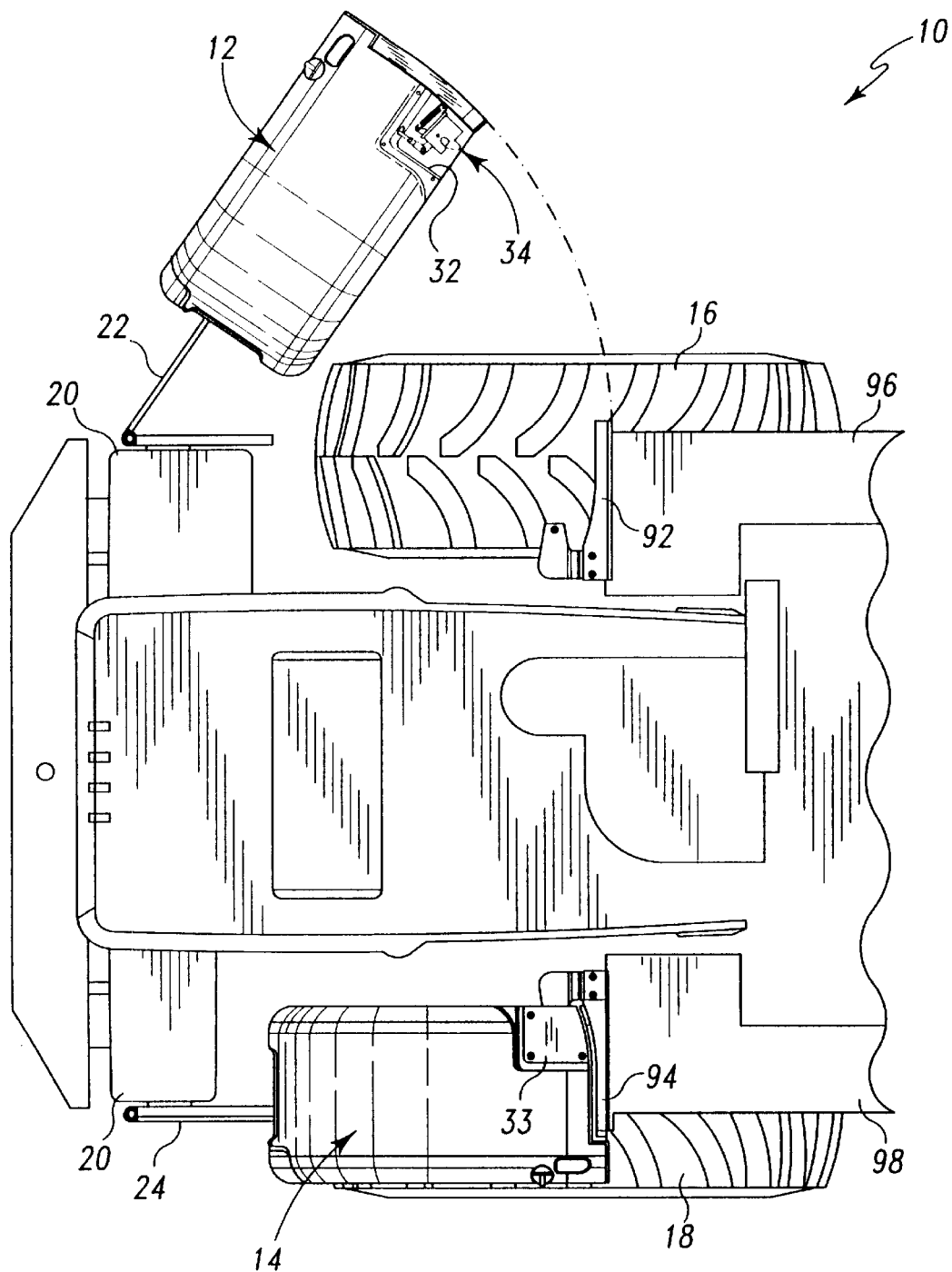
FIG. 2 is a fragmentary top elevational view of the work machine of FIG. 1 showing the left fender assembly positioned in the access position and the right fender assembly positioned in the operation position (note that the recess cover of the left fender assembly has been removed for clarity of description)

Referring now to FIGS. 1 and 2, there is shown a work machine 10, such as a wheel loader. The wheel loader 10 includes a left fender assembly 12 and right fender assembly 14. The fender assemblies 12, 14 are provided to prevent mud, dirt, or other types of debris from being flung or otherwise thrown from a pair of wheels 16, 18, respectively, during advancement of the wheel loader 10.

The fender assemblies 12, 14 are secured to a frame portion 20 of the wheel loader 10 by a pair of hinge assemblies 22, 24, respectively. The hinge assemblies 22, 24 allow the fender assemblies 12, 14 to pivot or otherwise move relative to the frame portion 20 of the wheel loader 10. In particular, the fender assemblies 12, 14 are positionable between an operation position (such as shown by the right fender assembly 14 in FIG. 2), and an access position (such as shown by the left fender assembly 12 in FIG. 2). It should be appreciated that during operation of the wheel loader 10, the fender assemblies 12, 14 are positioned in the operation position, whereas the fender assemblies 12, 14 may be positioned in the access position in order to allow a technician or the like to access a number of machine components associated with the wheel loader 10 during servicing thereof.

Figure 5:
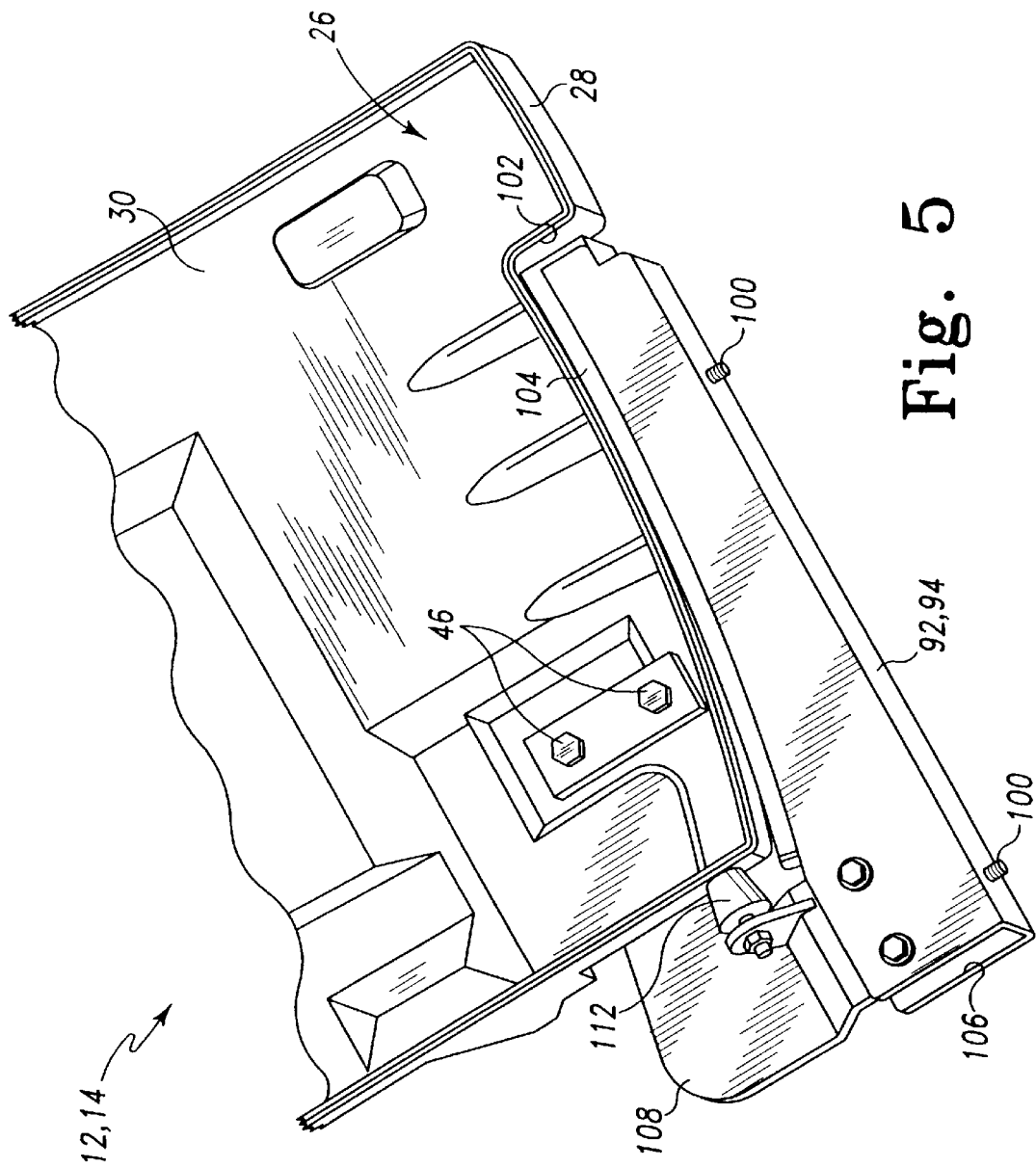
FIG. 5 is an enlarged fragmentary perspective view showing the fender assembly in the lock position as viewed from the bottom side thereof.

Each of the fender assemblies 12, 14 includes a fender body 26 having an upper fender panel 28 and lower fender panel 30 (see FIG. 5). Each of the fender panels 28, 30 are preferably molded from a non-metallic material, such as a fiberglass reinforced resin.

Figure 3:
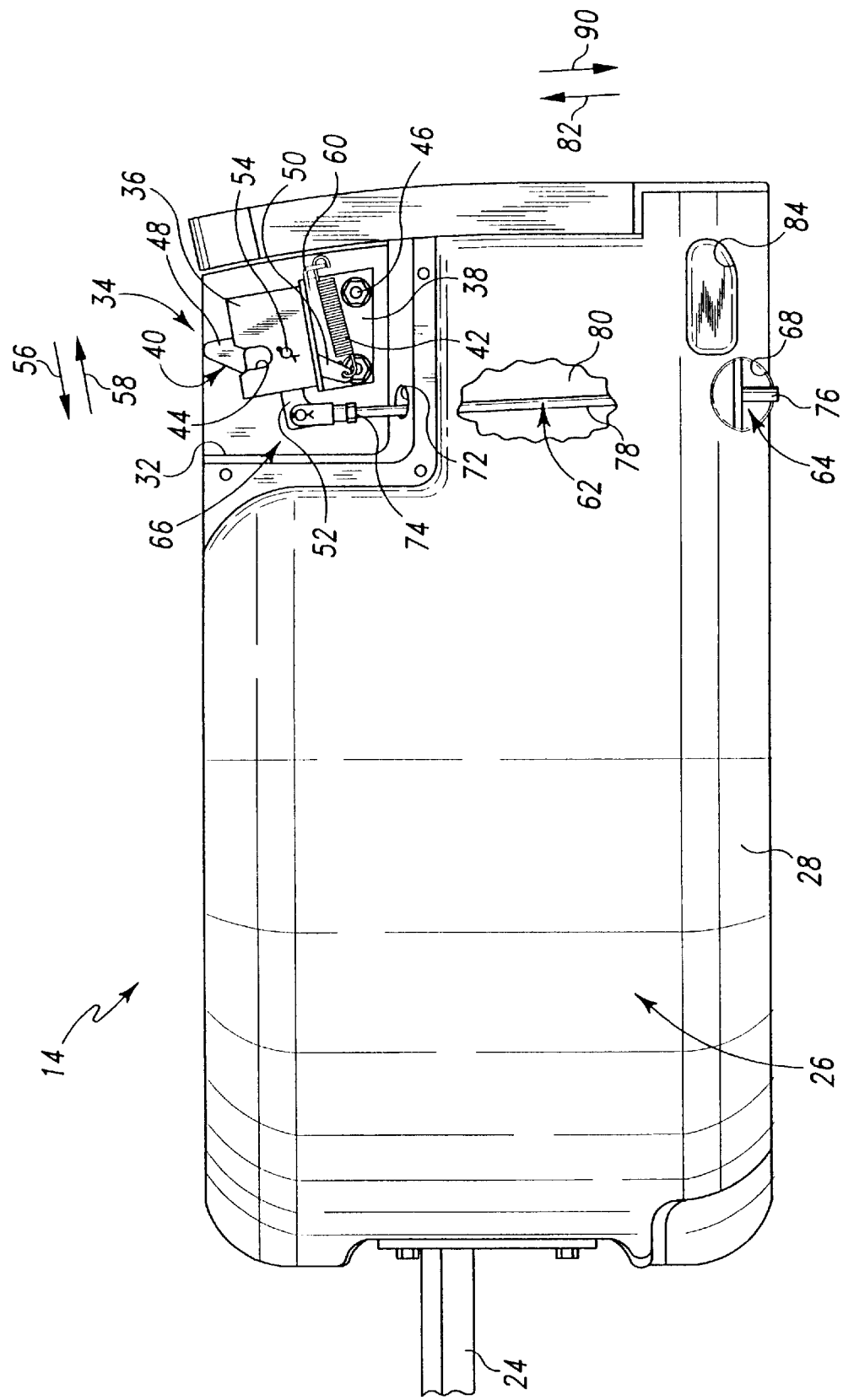
FIG. 3 is an enlarged fragmentary view of the right fender assembly of the work machine of FIG. 1 (note that a portion of the upper fender panel has been cut away for clarity of description)
Figure 4:
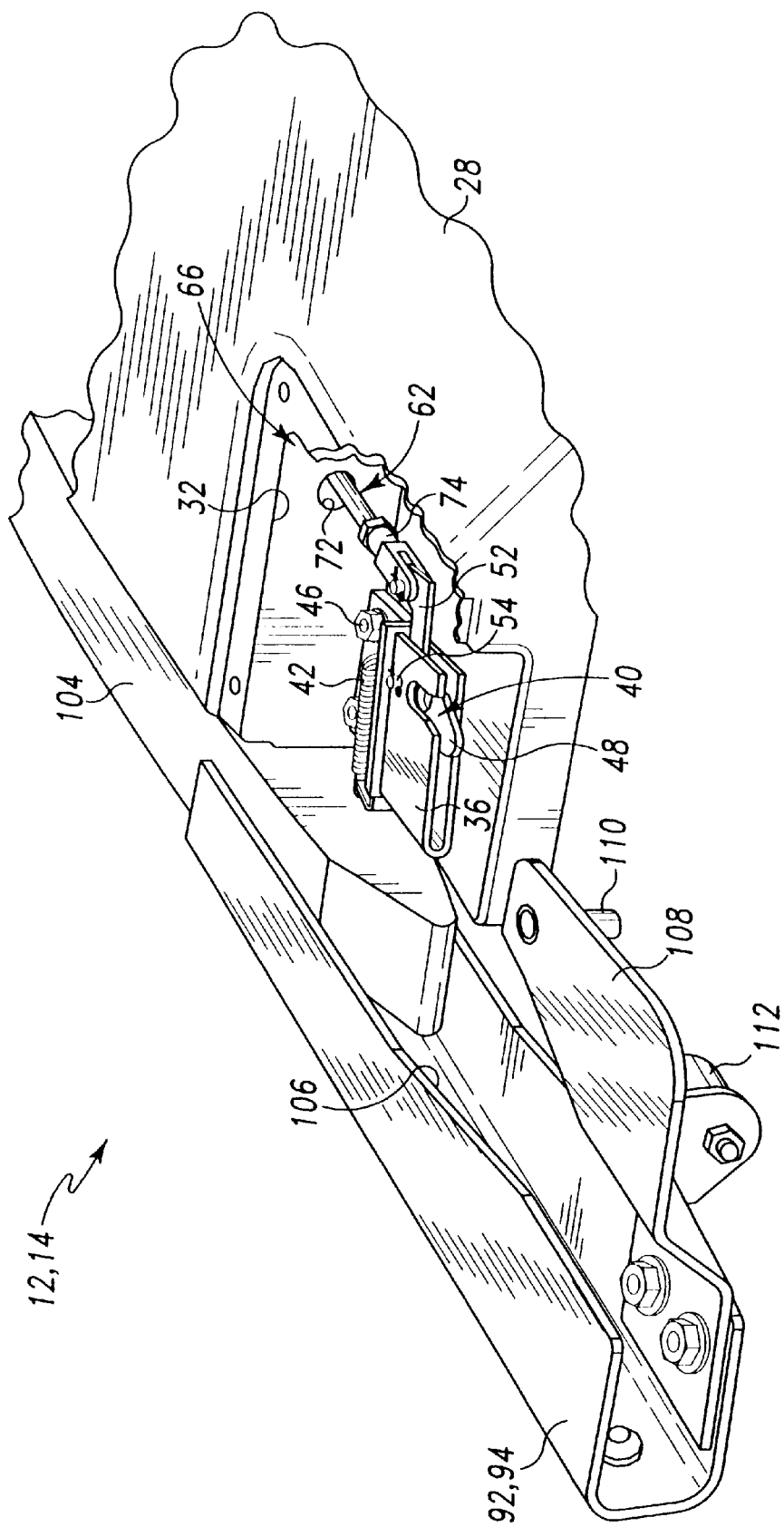
FIG. 4 is an enlarged fragmentary perspective view of the top side of the fender assembly of the work machine of FIG. 1 showing the shoe block being received into the guide member.

The upper fender panel 28 has a latch recess 32 defined in a top side thereof. A latch assembly 34 is positioned in the latch recess 32, as shown in FIG. 3. The latch assembly 34 includes a catch member 36, a mounting plate 38, a hook member 40, and a spring 42. The catch member 36 is substantially U-shaped, and has a receiving slot 44 defined therein, as shown in FIGS. 3 and 4. The catch member 36 is preferably welded to the mounting plate 38, which is in turn secured to the fender body 26 by a pair of fasteners 46 such as bolts (see also FIG. 5). As shown in FIG. 2, a recess cover 33 is securable to the upper fender panel 28 in order to cover or otherwise protect the latch assembly 34.

The hook member 40 includes a retaining arm 48, a spring arm 50, and an actuator arm 52. The retaining arm 48 is configured such that the open-ended portion of the receiving slot 44 is closed or otherwise obstructed when the hook member 40 is positioned in a lock position, as shown in FIG. 3. The hook member 40 may also be positioned in a release position in which the retaining arm 48 is positioned so as not to obstruct the receiving slot 44.

The hook member 40 is pivotally secured within the catch member 36 by a pin 54. Hence, the hook member 40 may be pivoted about the pin 54 such that the retaining arm 48 is urged in the general direction of arrow 56 of FIG. 3 thereby positioning the hook member 40 in the lock position. Alternatively, the hook member 40 may be pivoted about the pin 54 such that the retaining arm 48 is urged in the general direction of arrow 58 of FIG. 3 thereby positioning the hook member 40 in the release position.

The mounting plate 38 has a spring tab 60 secured thereto. A first end of the spring 42 is secured to the spring tab 60, whereas a second end of the spring 42 is secured to the spring arm 50 of the hook member 40. It should be appreciated that the bias of the spring 42 urges the spring arm 50 in the general direction of arrow 58 thereby causing the hook member 40 to rotate about the pin 54 such that the retaining arm 48 is urged in the general direction of arrow 56. As discussed above, such movement of the retaining arm 48 in the general direction of arrow 56 causes the hook member 40 to be positioned in the lock position.

Figure 6:
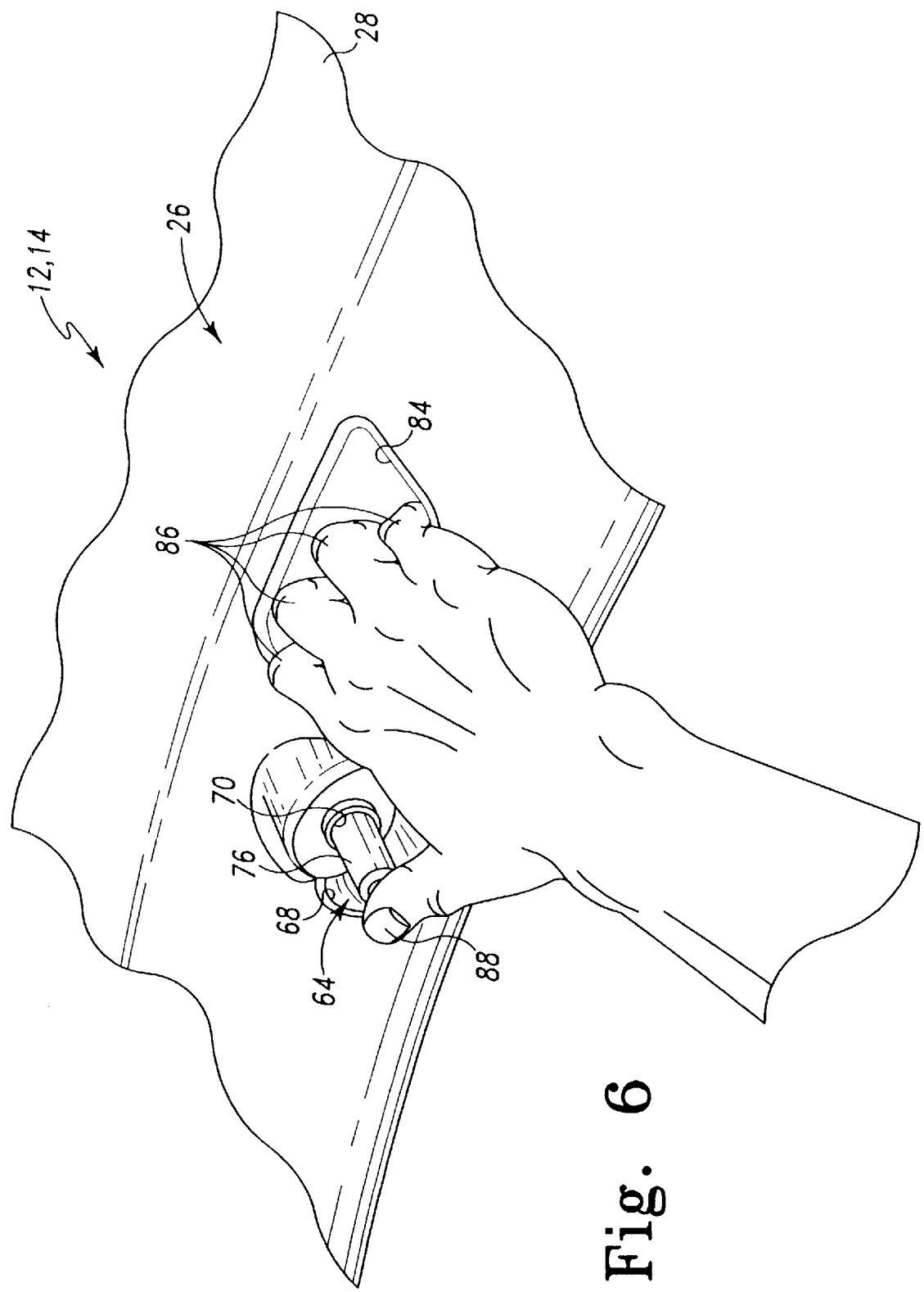
FIG. 6 is a fragmentary perspective view showing a hand positioned in order to actuate the latch mechanism of one of the fender assemblies of the work machine of FIG. 1.

Each of the fender assemblies 12, 14 also includes an actuator or rod 62. The rod 62 extends from a user-side location 64 to a latch-side location 66 of the fender body 26 and is provided to selectively move the hook member 40 between the lock position and the release position. In particular, the upper fender panel 28 has a user recess 68 (see FIG. 6) defined in the top side thereof. Moreover, the upper fender panel 28 has a user-side opening 70 and a latch-side opening 72 defined therein. As shown in FIGS. 6 and 3, respectively, the user-side opening 70 is located within the user recess 68, whereas the latch-side opening 72 is located within the latch recess 32. A latch-end portion 74 of the rod 62 is received through the latch-side opening 72 and is secured to the actuator arm 52 of the hook member 40, whereas a user-end portion 76 of the rod 62 is received through the user-side opening 70.

An intermediate portion 78 of the rod 62 extends between the user-side opening 70 and the latch-side opening 72 and is positioned in an actuator chamber 80 of the fender body 26 (see FIG. 3). It should be appreciated that the actuator chamber 80 is defined by the area between the upper fender panel 28 and the lower fender panel 30. Hence, the lower fender panel 30 is positioned between the intermediate portion 78 of the rod 68 and the wheels 16, 18 thereby preventing mud, dirt, or other types of debris flung from the wheels 16, 18 from contacting the intermediate portion 78 of the rod 62. It should also be appreciated that the area between the upper fender panel 28 and the lower fender panel 30 also defines a number of ribs in the fender body 26 thereby enhancing the structural rigidity of the fender assembly 12, 14.

As shown in FIG. 6, the upper fender panel 28 further has a gripping recess 84 defined therein. An operator or other user may place his or her fingers 86 in the gripping recess 84 while also placing his or her thumb 88 on the user-end portion 76 of the rod 62. Hence, if the user presses or otherwise urges the user-end portion 76 of the rod 62 with his or her thumb 88, the rod 62 will be urged in the general direction of arrow 82 of FIG. 3. As the rod 62 is urged in the general direction of arrow 82, the actuator arm 52 of the hook member 40 is likewise urged in the general direction of arrow 82 thereby causing the hook member 40 to pivot about the pin 54 such that the retaining arm 48 is urged in the general direction of arrow 58 thereby positioning the hook member 40 in the release position.

If the operator releases the user-end portion 76 of the rod 62, the bias generated by the spring 42 urges the spring arm 50 of the hook member 40 in the general direction of arrow 58 of FIG. 3 thereby causing the hook member 40 to rotate about the pin 54. Such rotation of the hook member 40 causes (1) the retaining arm 48 to be urged in the general direction of arrow 56 thereby positioning the hook member in the lock position, and (2) the actuator arm 52 to be urged in the general direction of arrow 90 of FIG. 3 which in turn causes the rod 62 to be urged back to its original position.

Each of the fender assemblies 12, 14 further includes a pair of guide members 92, 94, respectively, as shown in FIG. 2. The guide members 92, 94 are secured to a pair of structural members 96, 98, respectively, associated with the wheel loader 10 via a number of fasteners 100 such as bolts (see FIG. 5).

Each of the guide members 92, 94 has a bracket 108 secured thereto, as shown in FIG. 4. The brackets 108 have a locking pin 110 attached thereto. The locking pin 110 is positionable within the receiving slot 44 of the catch member 36 so as to secure the fender assemblies 12, 14 to the structural members 96, 98. In particular, when the locking pin 110 is positioned in the receiving slot 44 of the catch member 36 and the hook member 40 is positioned in its lock position such that the retaining arm 48 obstructs the open end of the receiving slot 44, the fender assemblies 12, 14 are secured to structural members 96, 98, respectively, and hence positioned in their respective operation positions. Alternatively, when either (1) the locking pin 110 is not positioned in the receiving slot 44, or (2) the hook member 40 is positioned in its release position, the fender assemblies 12, 14 are free to pivot or otherwise move relative to the structural members 96, 98, respectively, thereby allowing the fender assemblies 12, 14 to assume their respective access positions.

The guide members 92, 94 guide or otherwise align the fender assemblies 12, 14 as the fender assemblies 12, 14 are moved from their respective access positions to their respective operation positions. In particular, each of the guide members 92, 94 has a guide channel 106 (see FIG. 4) defined therein. The upper fender panel 28 of each of the fender assemblies 12, 14 has a shoe recess 102 defined therein (see FIG. 5). A shoe block 104 is secured to the fender body 26 within the shoe recess 102. It should be appreciated that the shoe block 104 may be made of any suitable wear material, such as nylon. As the fender assemblies 12, 14 are pivoted or otherwise moved such that the fender assemblies 12, 14 are moved from their respective access positions to their respective operation positions, the shoe blocks 104 are received into the guide channels 106 of the guide members 92, 94 thereby aligning the locking pins 110 with the receiving slots 44 of the fender assemblies 12, 14.

In order to provide over-travel protection, a bumper 112 (see FIGS. 4 and 5) is secured to each of the brackets 108. The bumpers 112 are preferably made of a compressible elastomeric material, such as rubber. Moreover, the length of the bumpers 112 is configured such that the bumpers 112 generate a slight bias against the fender body 26 when the fender assemblies 12, 14 are positioned in their respective operation position thereby urging the locking pins 110 into contact with the retaining arms 48 of the hook members 40. It should be appreciated that such a bias enhances the rigidity of the fender assemblies 12, 14 thereby reducing bouncing and rattling of the fender assemblies 12, 14 during operation of the work machine 10.

Industrial Applicability

In operation, in order to move the fender assembly 12, 14 from the operation position to the access position, an operator or other user places his or her fingers 86 in the gripping recess 82 while also placing his or her thumb 88 on the user-end portion 76 of the rod 62. Thereafter, the user presses or otherwise urges inwardly the user-end portion 76 of the rod 62 with his or her thumb 88, thereby causing the rod 62 to be urged in the general direction of arrow 82 of FIG. 3. As the rod 62 is urged in the general direction of arrow 82, the actuator arm 52 of the hook member 40 is likewise urged in the general direction of arrow 82 thereby causing the hook member 40 to pivot about the pin 54 such that the retaining arm 48 is urged in the general direction of arrow 58 thereby positioning the hook member 40 in the release position.

Thereafter, the operator pulls or otherwise moves the fender body 26 of the fender assembly 12, 14 outwardly relative to the structural member 96, 98, respectively, thereby causing the locking pin 110 to be advanced out of the receiving slot 44 of the catch member 36. The operator may then continue to pull the fender body 26 until the fender assembly 12, 14 is positioned in their respective access positions.

To return the fender assembly 12, 14 to its operation position, the operator pushes or otherwise urges the fender body 26 toward the structural member 96, 98, respectively. As the shoe block 104 is received into the guide channel 106 of the guide member 92, 94, respectively, the locking pin 110 is aligned with the receiving slot 44 of the catch member 36. Once aligned, the locking pin 110 contacts the retaining arm 48 of the hook member 40 thereby urging the retaining arm 48 in the general direction of arrow 58 of FIG. 3 so as to position the hook member 40 in the release position. Once the locking pin 110 is advanced into the receiving slot 44 to a location beyond the retaining arm 48, the bias generated by the spring 42 urges the spring arm 50 of the hook member 40 in the general direction of arrow 58 of FIG. 3 thereby causing the hook member 40 to rotate about the pin 54. Such rotation of the hook member causes the (1) the retaining arm 48 to be urged in the general direction of arrow 56 thereby positioning the hook member in the lock position, and (2) the actuator arm 52 to be urged in the general direction of arrow 90 of FIG. 3 which in turn causes the rod 62 to be urged back into its original position.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A fender assembly for a work machine, comprising:
   a fender body having a first panel, wherein (i) said fender body is positionable between an operation position and an access position, (ii) said first panel has a latch recess defined therein, (iii) said first panel further has a user-side opening and a latch-side opening defined therein, and (iv) said latch-side opening is located within said latch recess;
   a latch assembly positioned in said latch recess, said latch assembly being positionable between (i) a lock position in which said fender body is secured in said operation position, and (ii) a release position in which said fender body is allowed to move between said operation position and said access position; and
   an actuator for moving said latch assembly between said lock position and said release position, wherein (i) said actuator extends from a user-side location to a latch-side location through said user-side opening and said latch-side opening, (ii) said user-side location is located above said first panel of said fender body, and (iii) said latch-side location is located within said latch recess.

2. The fender assembly of claim 1, wherein:
   said fender body further has a second panel which is spaced apart from said first panel so as to define an actuator chamber,
   said actuator includes an intermediate portion which extends between said user-side opening and said latch-side opening, and
   said intermediate portion is located within said actuator chamber.

3. The fender assembly of claim 1, further comprising a recess cover which is secured over said latch recess.

4. The fender assembly of claim 1, wherein said actuator includes a rod which extends from said user-side location to said latch-side location through said user-side opening and said latch-side opening.

5. The fender assembly of claim 1, wherein:
   said actuator includes a user-end portion and a latch-end portion,
   said latch-end portion is secured to said latch assembly, and
   said user-end portion is located above said first panel of said fender body.

6. The fender assembly of claim 5, wherein said latch-end portion is positioned within said latch recess.

7. The fender assembly of claim 6, wherein:
   said first panel of said fender body has a user recess defined therein,
   said user-side opening is located within said user recess, and
   said user-end portion of said actuator is located within said user recess.

8. The fender assembly of claim 7, wherein:
   said first panel of said fender body has a gripping recess defined therein, and
   said gripping recess is located adjacent to said user recess, whereby a user's fingers are positionable in said gripping recess while said user's thumb is positioned on said user-end portion of said actuator.

9. The fender assembly of claim 1, further comprising a shoe block and a guide member, wherein:
   said fender body further has a shoe recess defined therein,
   said shoe block is secured within said shoe recess,
   said guide member is secured to said work machine,
   said guide member has a guide channel defined therein,
   said shoe block is positioned within said guide channel when said fender body is positioned in said operation position, and
   said shoe block is spaced apart from said guide channel when said fender body is positioned in said access position.

10. A fender assembly for a work machine, comprising:
    a fender body having an upper panel and a lower panel, wherein (i) said fender body is positionable between an operation position and an access position, (ii) said upper panel has a latch recess defined therein, (iii) said upper panel further has a user-side opening and a latch-side opening defined therein, (iv) said latch-side opening is located within said latch recess, and (v) said lower panel is spaced apart from said upper panel so as to define an actuator chamber;
    a latch assembly positioned in said latch recess, said latch assembly being positionable between (i) a lock position in which said fender body is secured in said operation position, and (ii) a release position in which said fender body is allowed to move between said operation position and said access position; and
    an actuator for moving said latch assembly between said lock position and said release position, wherein (i) said actuator extends from a user-side location to a latch-side location through said user-side opening and said latch-side opening, (ii) said user-side location is located above said upper panel of said fender body, (iii) said latch-side location is located within said latch recess, (iv) said actuator further includes an intermediate portion, a user end portion, and a latch end portion, (v) said intermediate portion extends between said user-side opening and said latch-side opening and is located within said actuator chamber, (vi) said latch-end portion is secured to said latch assembly, and (vii) said user-end portion is located above said upper panel of said fender body.

11. The fender assembly of claim 10, further comprising a recess cover which is secured over said latch recess.

12. The fender assembly of claim 10, wherein said actuator includes a rod which extends from said user-side location to said latch-side location through said user-side opening and said latch-side opening.

13. The fender assembly of claim 10, wherein said latch-end portion is positioned within said latch recess.

14. The fender assembly of claim 13, wherein:
    said upper panel of said fender body has a user recess defined therein,
    said user-side opening is located within said user recess, and
    said user-end portion of said actuator is located within said user recess.

15. The fender assembly of claim 14, wherein:
    said upper panel of said fender body has a gripping recess defined therein, and said gripping recess is located adjacent to said user recess, whereby a user's fingers are positionable in said gripping recess while said user's thumb is positioned on said user-end portion of said actuator.

16. The fender assembly of claim 10, further comprising a shoe block and a guide member, wherein:

said fender body further has a shoe recess defined therein, said shoe block is secured within said shoe recess, said guide member is secured to said work machine, said guide member has a guide channel defined therein, said shoe block is positioned within said guide channel when said fender body is positioned in said operation position, and said shoe block is spaced apart from said guide channel when said fender body is positioned in said access position.

17. A work machine, comprising:

a fender body having a first panel, wherein (i) said fender body is positionable between an operation position and an access position, (ii) said first panel has a latch recess defined therein, (iii) said first panel further has a user-side opening and a latch-side opening defined therein, and (iv) said latch-side opening is located within said latch recess;

a latch assembly positioned in said latch recess, said latch assembly being positionable between (i) a lock position in which said fender body is secured in said operation position, and (ii) a release position in which said fender body is allowed to move between said operation position and said access position;

an actuator for moving said latch assembly between said lock position and said release position, wherein (i) said actuator extends from a user-side location to a latch-side location through said user-side opening and said latch-side opening, (ii) said user-side location is located above said first panel of said fender body, and (iii) said latch-side location is located within said latch recess;

a recess cover which is secured over said latch recess;

a shoe block, wherein (i) said fender body further has a shoe recess defined therein, and (ii) said shoe block is secured within said shoe recess;

a structural member, wherein (i) said fender body is secured to said structural member when said fender body is positioned in said operation position, and (ii) said fender body is spaced apart from said structural member when said fender body is positioned in said access position; and a guide member, wherein (i) said guide member is secured to said structural member, (ii) said guide member has a guide channel defined therein, (iii) said shoe block is positioned within said guide channel when said fender body is positioned in said operation position, and (iv) said shoe block is spaced apart from said guide channel when said fender body is positioned in said access position.

18. The work machine of claim 17, wherein:

said fender body further has a second panel which is spaced apart from said first panel so as to define an actuator chamber, said actuator includes an intermediate portion which extends between said user-side opening and said latch-side opening, and said intermediate portion is located within said actuator chamber.

19. The work machine of claim 17, wherein said actuator includes a rod which extends from said user-side location to said latch-side location through said user-side opening and said latch-side opening.

20. The work machine of claim 17, wherein:

said actuator includes a user-end portion and a latch-end portion, said latch-end portion is secured to said latch assembly, said user-end portion is located above said first panel of said fender body, and said latch-end portion is positioned within said latch recess.

* * * * *